(12) United States Patent
Gluskin

(10) Patent No.: US 9,648,274 B2
(45) Date of Patent: May 9, 2017

(54) COORDINATED VIDEO-PHONE OVERLAY ON TOP OF PC DESKTOP DISPLAY

(71) Applicant: AVAYA, INC., Basking Ridge, NJ (US)

(72) Inventor: Dan Gluskin, Tel-Aviv (IL)

(73) Assignee: Avaya, Inc., Basking Ridge, NJ (US)

( * ) Notice: Subject to any disclaimer, the term of this patent is extended or adjusted under 35 U.S.C. 154(b) by 159 days.

(21) Appl. No.: 14/159,631

(22) Filed: Jan. 21, 2014

(65) Prior Publication Data

US 2015/0208029 A1    Jul. 23, 2015

(51) Int. Cl.
*G06F 3/048* (2013.01)
*H04N 7/14* (2006.01)
*G06F 3/0482* (2013.01)

(52) U.S. Cl.
CPC ........... *H04N 7/141* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 5,999,207 A * | 12/1999 | Rodriguez | ............ | H04N 7/147 348/14.03 |
| 6,259,449 B1 * | 7/2001 | Saxena | ................. | G06F 3/0481 715/853 |
| 7,373,650 B1 * | 5/2008 | Rodriguez | ......... | H04N 5/44591 348/565 |
| 7,860,994 B2 * | 12/2010 | Rensin | ............. | H04L 29/06027 455/456.3 |
| 9,165,605 B1 * | 10/2015 | Friedman | ............... | G11B 27/34 |
| 2004/0109014 A1 * | 6/2004 | Henderson | ............. | G09G 5/377 715/716 |
| 2011/0080519 A1 * | 4/2011 | Chowdhry | ........... | H04N 19/115 348/453 |
| 2013/0147901 A1 * | 6/2013 | Weiser | ................ | H04L 65/1006 348/14.08 |
| 2014/0192199 A1 * | 7/2014 | Tan | .................... | H04N 21/2187 348/159 |
| 2015/0054823 A1 * | 2/2015 | Dzhurinskiy | ........ | H04N 5/2226 345/419 |
| 2015/0188970 A1 * | 7/2015 | Kowshik | ............... | H04L 65/602 715/204 |

\* cited by examiner

*Primary Examiner* — Hua Lu

(57) ABSTRACT

Disclosed is a system and method for rendering a video from a video phone system to a monitor associated with a computing device such a PC. A chroma-key color is utilized to define a video window in the monitor and the video phone system will overlay video content in the window. A mouse pointer will continue to be visible even when it is in the video overlay location and continue to be able to manipulate and control content in the monitor, including the video layout.

20 Claims, 3 Drawing Sheets

COORDINATED VIDEO-PHONE OVERLAY ON TOP OF PC DESKTOP DISPLAY

FIELD OF THE INVENTION

The field of the invention relates generally to video calls and display of video calls.

BACKGROUND OF THE INVENTION

A video phone may have video output ports, HDMI for example, which can drive an external monitors. This allows the end user to experience an immersive video conferencing which is not possible using small displays that are common with video phones. However, due to budget and/or limited desktop area, most users are unlikely to have a dedicated monitor for video calls. Alternatively, user may want to let the video phone share the PC monitor which is already available. Many monitors have two or more video inputs so it may be possible to toggle between a full-screen PC and full screen video by using the monitor controls.

A video device may be enabled to accept a PC output and display it together with video. This may be accomplished by scaling the output. Additionally the video devices may be enabled to show full screen PC and full screen video.

Video devices may be enabled to accept a PC output and display it together with video. This may be accomplished in two modes. A first mode may be a full screen video mode. A second mode may be a full screen PC with a small overlay video in a fixed position.

A phone may be enabled to play audio and an accompanying PC may be enabled to receive an associated video stream. The PC would also decode the video stream and show it on the monitor. The phone and the PC would work in concert to present the corresponding video call in separate video and audio presentations.

SUMMARY OF THE INVENTION

An embodiment of the invention may therefore comprise a method for providing content from an intermediate system to one of one or more monitors associated with a computing device, wherein the computing device is operably linked to the intermediate system and the intermediate system is operably linked to one of the one or more monitors, the method comprising by the intermediate system, sending a message to a control application to open a window of a specific size on a desktop of the computing device, by the control application, opening a window of the specific size on the desktop of the computing device, by the control application, sending size, location on the desktop and chroma-key information of the opened window to the intermediate system, by the intermediate system, overlaying content on top of the location on the desktop sent by the control application, and by the control application, sending updated size and location information of the opened window to the intermediate system.

An embodiment of the invention may further comprise a system for rendering a video, the system comprising a computing device associated with one or more monitors, an intermediate system comprising a control application and a control application, wherein the intermediate system is enabled to send a message to the control application for the control application to open a window of a specific size on a desktop of the computing device and overlay content on top of the location of the desktop sent by the control application, and the control application is enabled to open a window of a specific size on the desktop of a computing device, send size, location of the desktop and chroma-key information of the opened window to the intermediate system and send updated size and location information of the opened window to the intermediate system.

An embodiment of the invention may further comprise a method for displaying content from an intermediate system to a monitor, the method comprising by the intermediate system, sending a request to a control application via a network connection to open a window of a specific size on a desktop running in a virtual desktop environment on a virtual desktop infrastructure server, by the control application, opening a window on the desktop, by the control application, sending size, location and chroma-key information of the opened window to the intermediate system via the network connection, by the intermediate system, overlaying content on top of the location on the desktop sent by the control application, and by the control application, sending updated size and location information of the opened window to the intermediate system via the network connection.

DETAILED DESCRIPTION OF THE EMBODIMENTS

Figure 1:
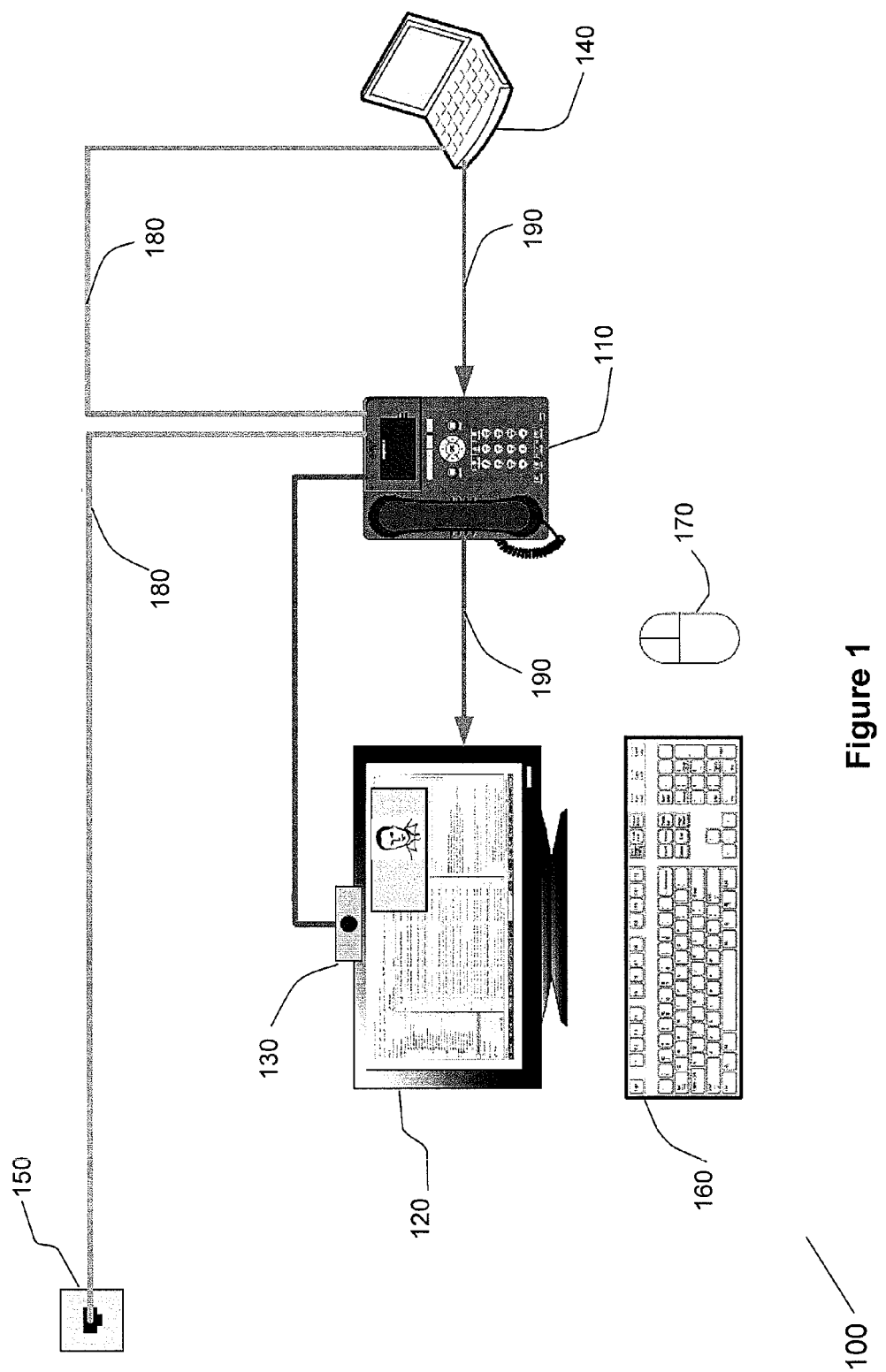
FIG. 1 is a system diagram of coordinated video-phone overlay system connectivity.

Video calls are more effective if participants to the video calls are provided with a more total experience. In essence, this is accomplished by providing a feeling to the participants that they are in the same room. There are a number of aspects that lend themselves to providing this feeling. First, the video should be rendered on a display that is big enough so that the torso and eyes of other participants are shown in a size that allows a user to comfortably view those other participants. The challenge of rendering a comfortable viewing of participants in a multi-party call increases due to the same monitor real estate now being divided in order to display the different participants concurrently. Second, a camera being used for the video call should be placed above the rendered video. While this may not be an absolute, for the camera to be above the rendered video allows the level of a user's eyes to maintain eye contact perception. Third, the video system should provide a persistent high quality and low delay video channel. This last aspect is self-explanatory. A choppy video, poorly synced video or otherwise unsuitable visual detracts from a quality video call experience.

Generally, video appliances, or video phones, are dedicated devices that are optimized to provide persistent, high-quality and low delay video. In many cases a modem computer may support acceptable video call performance. However, in many situations, the result may not be optimal due to the fact that the computer is required to run other applications at the same time. This is especially true when the latest video compression standards, such as H.264 high-profile or H.265 for example, are used. In many cases, a video phone system, or like appliance, has the advantage over a modem computer because it is a dedicated device that has application specific hardware which is optimized for video compression and decompression (an ASIC, for example).

However, video-phones do not generally include large embedded displays due to the need to conserve space and the relatively high price of large display panels. Moreover, the desire to make video-phones compact may lead to the video phone camera and display being located in a less than optimal position in the device. Several terms may be used throughout his description to apply to systems intended to enable a use to engage in a video conference using a personalized video phone type system. The terms are intended to apply to a video phone system which may present some of the size and clarity issues discussed. A video phone is a telephone with a video display capable of simultaneous video and audio for communication between people in real-time. Various terms, such as "personal video conferencing system", or other term used herein are intended to refer to a video phone system as described.

A video phone enabled to have video output, such as HDMI, driving an external monitor do not enable a user to see the video call and an associated PC desktop on the monitor simultaneously. It is understood that other types of connections are available. Other connections may include DisplayPort, DVI (Digital Visual Interface), VGA (Video Graphics Array), or other connection type such as Thunderbolt. A video device enabled to accept PC output and display it may allow a user to see video and PC simultaneously but make it hard to read text from the PC after a scale down manipulation. This may be so because the PC uses TrueType fonts which are rendered to match the current resolution. It is understood that TrueType font is an outline font standard that is commonly used for fonts on both Mac OS and Microsoft Windows operating systems. TrueType font offers control over how fonts are displayed at various font sizes. Further, if the PC image includes text then scaling it down (so the video will fit) might make the font illegible. For video devices which can accept PC output and display it together with video in two modes, these devices are generally unable to show a large video window when the PC desktop is displayed. Further, a user may not have a sufficient means to manipulate the video window to move it out of the way if it covers a toolbar or menu item that the user desires to access. Also, the video window may cover the mouse pointer if it happens to be behind the window, causing a user to lose track of the mouse. It is understood that there are one or more devices that may overlay content onto a semi-transparent window. However, in such a device, and solution, it does not allow a user to manipulate the window just as any other window. The device, or solution, may allow a control application to take control of a mouse and keyboard. The device, or solution, may then render a unique mouse pointer that can only interact with the GUI (Graphical User Interface) elements rendered by the desktop video device. As such, manipulation of the video and use of the cursor within the video window are severely restricted and may require specific action by the user to switch control of the mouse and keyboard from one controlling device, the computer or the video device, to the other.

A phone that only plays the audio and the PC receives and plays an incoming video stream may be a soft-client application solution. Such a soft-client application requires that the PC have all video codecs. Also, an additional issue with a soft-client is that the PC needs to have a CPU that is powerful enough and/or a PC with video compression and decompression HW accelerators. Further video delay optimization is performed on the PC (as those skilled in the art will understand soft-client applications) and, if the PC's CPU is heavily loaded by other applications, video may accordingly lag or even drop frames. As noted, video and audio sync is difficult to assure due to the fact that they are rendered by different devices.

Embodiments of the invention are also applicable when a physical video device, such as a video phone, is a VDI client. A Virtual Desktop Infrastructure (VDI) is a desktop-centric service that hosts user desktop environments on remote servers and/or blade PCs, which are accessed over a network using a remote display protocol. A connection brokering service is used to connect users to their assigned desktop sessions. For users, this means they can access their desktop from any location, without being tied to a single client device. Since the resources are centralized, users moving between work locations can still access the same desktop environment with their applications and data. For IT administrators, this means a more centralized, efficient client environment that is easier to maintain and able to respond more quickly to the changing needs of the user and business. Those skilled in the art will understand uses of a VDI in embodiments of the invention.

A video phone may be enabled to share a large computer monitor which a user already has available. The computer monitor may be one associated with a PC or one that is associated with other monitors as discussed in this description. A user may utilize the monitor, while using the computer, during a video call. Embodiments of the invention allow a user to conveniently see both the desktop user interface and functions of a computer monitor and the video rendered by a video phone simultaneously. In some embodiments the user may be allowed to scale, move, hide and unhide a video rendered by a video phone on the PC monitor in a manner consistent with any other application. Those skilled in the art will understand the techniques available to manipulate applications and other visualizations on a monitor. For instance, several keyboard or mouse techniques may be utilized. This provides usability of the embodiments of the invention, especially when a video call appearance is sized to accommodate most or a large portion of the monitor display area.

In an embodiment of the invention, methods and systems will have an HDMI input that is connectable to a user's PC and an HDMI output that can connect to a monitor. It is understood that other types of connections are available. Other connections may include DisplayPort, DVI (Digital Visual Interface), VGA (Video Graphics Array), or other connection type such as Thunderbolt. Those skilled in the art will understand application of embodiments of the invention using these other connectivity types, as well as HDMI which is used here for purposes of example. As noted, the monitor may be associated with a PC or other computing device that provides a computing desktop. A computing device is a computer, such as a PC (Personal/Professional Computer) that allows a computer's desktop environment to be run remotely on one system (usually a PC, but the concept applies equally to a server), while being displayed on a separate client device. Those skilled in the art will understand applications of embodiments of the invention to a variety of monitor type functionalities. A video phone system is enabled with a control application that performs a variety of functions. The control application (which may also be referred herein as a content application or a companion application) will be enabled to detect when the video phone system is connected to the PC and to which video display ports (if there are multiple ports). When a video call initiates through the video phone system, the video phone system will request that the control application open a blank window on the associated PC monitor. The control application fills the window with a color (pre-defined or negotiated) and sends the color code to the video phone along with window location and size. The video phone will overlay the rendered video call on top of the blank window that was created by the control app. The control application will fill the window with an appropriate color. The color may be pre-defined or negotiated. In either case, the color is a defined color, where the pre-defined aspect will result in a defined color or a negotiation will result in a defined color. The color is used as a chroma-key by the system. Chroma key compositing, or chroma keying, is a special effects/post-production technique for compositing (layering) two images or video streams together based on color hues (chroma range). The technique has been used heavily in many fields to remove a background from the subject of a photo or video—particularly the news casting, motion picture and videogame industries. A color range in the top layer is made transparent, revealing another image behind. In an embodiment of the invention, the content supplied by a device may be considered behind. The chroma keying technique is commonly used in video production and post-production. This technique is also referred to as color keying, color-separation overlay (CSO), or by various terms for specific color-related variants such as green screen, and blue screen—chroma keying can be done with backgrounds of any color that are uniform and distinct.

Continuing with the embodiment of the invention, the control application will update the video phone system about the window size and position in the PC monitor desktop. The video phone system may have a hardware unit can overlay content (like the video call) on-top of the incoming video-stream from the HDMI or the internal VDI client. In the current embodiments, the incoming video stream is the PC desktop display. The video phone system will place the video on the location specified by the control application. The video phone system will also scale the video appropriately to fit the window (but the PC display is not scaled and font appearance is accordingly not affected). The video phone system will check the content of the multiple pixels inside the area specified by the control application to detect the numerical value of the chroma-key. This may be necessary in case the chroma-key was modified by the PC display card due to color calibration, or otherwise. The video phone system will over lay the video content only for pixels where the color is equal to the numerical value of the chroma-key. Accordingly, the mouse pointer will be visible even when it is in the video overlay location. This is because the mouse pointer will cover the selected chroma-key so that the video phone system will show it instead of the video in the appropriate location only. In the case where the display, or monitor, is without a PC, the video phone system may render the video on the entire display.

The control application to the video phone system will send mouse click coordinates and key presses to the video phone system when the overlay video window is in focus. This allows the video phone system to render user-interface controls inside of the overlay window.

Embodiments of the invention allow a user to control the size and position of video decoded and rendered by a phone using the PC keyboard and/or mouse. This type of operation of manipulating windows in a display is understood by those skilled in the art. Embodiments also allow a user to quickly move the video out of the way if it is in an inconvenient location. This type of operation of moving windows in a display is understood by those skilled in the art. A mouse pointer will not be covered by the video which allows for full, or mostly full, screen windows to be utilized. Embodiments also allow a user to interact with a user interface rendered by the video phone system without requiring a change in the PC control application. Unlike a regular device control application which renders its own UI (User Interface), the embodiment described here allows the video phone to render its UI directly. Hence, it is possible to change the UI by changing only the phone's firmware (without changing the PC application). Essentially, seamless user interface integration of video rendered by a video phone and personal computer desktop is provided by embodiments of the invention.

FIG. 1 is a system diagram of coordinated video-phone overlay system connectivity. In the system 100, a video phone system 110 connects to a PC monitor 120. The PC monitor 120 may have an installed/embedded camera 130. The video phone system 110 also connects to the PC 140. The video connections 190 of the video phone system 110 to the PC 140 and the monitor 110 may be HDMI connections. The PC is connected 180 to the network 150 (showing a network connection and not an actual network—the network is not shown) through the phone internal switch. The connection 180 provides a communication channel between the computing device/PC 140 and the video phone system 110. This connection 180 may be an Ethernet type connection. Those skilled in the art will understand other connectivity types and formats that enable video phone 110 to communicate with a network (not shown in FIG. 1) and a computing device/PC 140. The video connection 190 between the video phone 110 and the computing device/PC 140 as well as the network connection 180 between the video phone 110 and the computing device/PC 140 provides an operable link between the video phone 110 and the computing device/PC 140. Those skilled in the art will understand the exemplary nature of this embodiment. For instance, the video connection 190 and the network connection 180 may be combined into a connection that provides for both communication between the video phone 110 and the computing device/PC 140 and the sending in of video content from the computing device/PC 140 to the video phone 110, with an opened blank window filled with a specified chroma-key for example. The camera 130 installed with the monitor 120 is also connected to the phone 110. A keyboard 160 and mouse 170 are used to provide input to the PC 140.

The video conference phone 110 HDMI 180 output allows it to render video on a large monitor. However, as noted, a user may not desire to dedicate a whole monitor just for a video call. The video conference phone 110 is enabled to share the user's existing PC Monitor 120. The video conference phone 110 is connected between the user's PC 140 and its monitor 120 so it is able to toggle between a video view, a PC view or a combined view on the user provided monitor.

Figure 2:
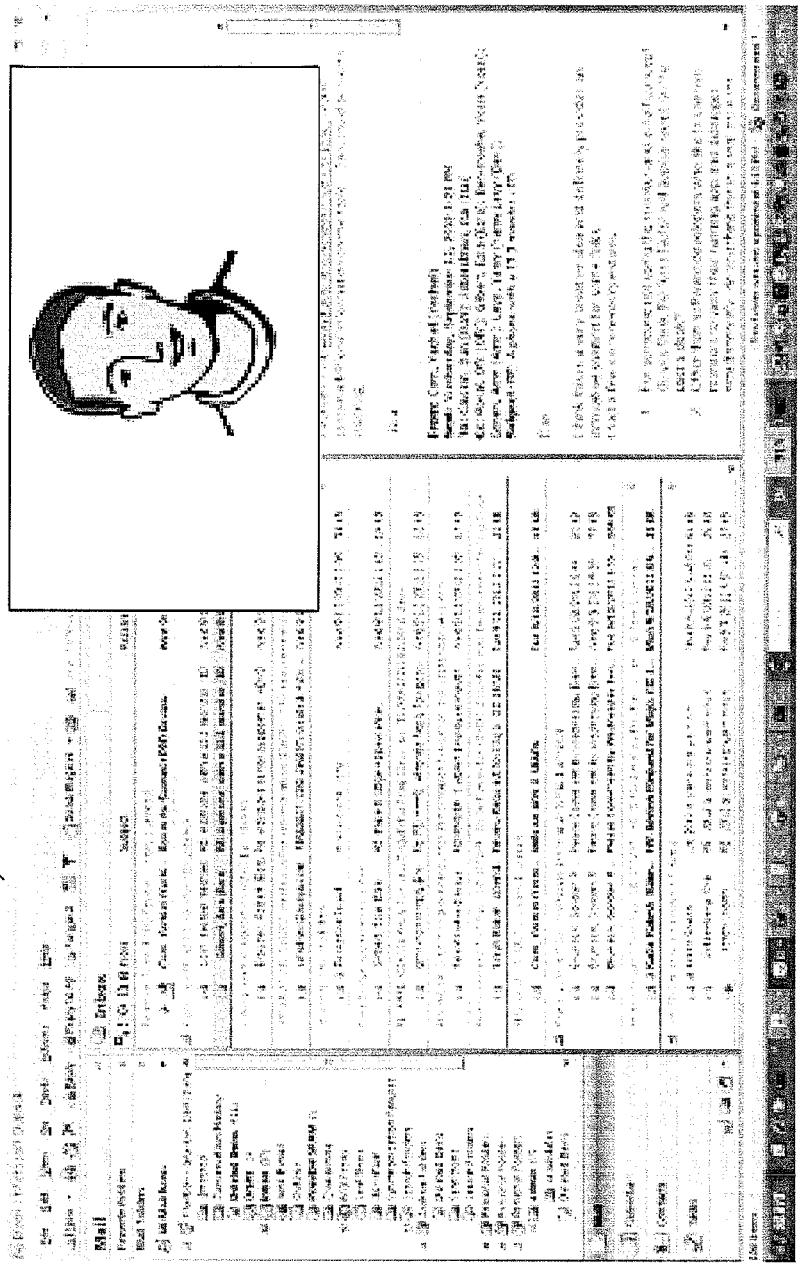
FIG. 2 is a diagram of a video overlay on a PC monitor.
Figure 3:
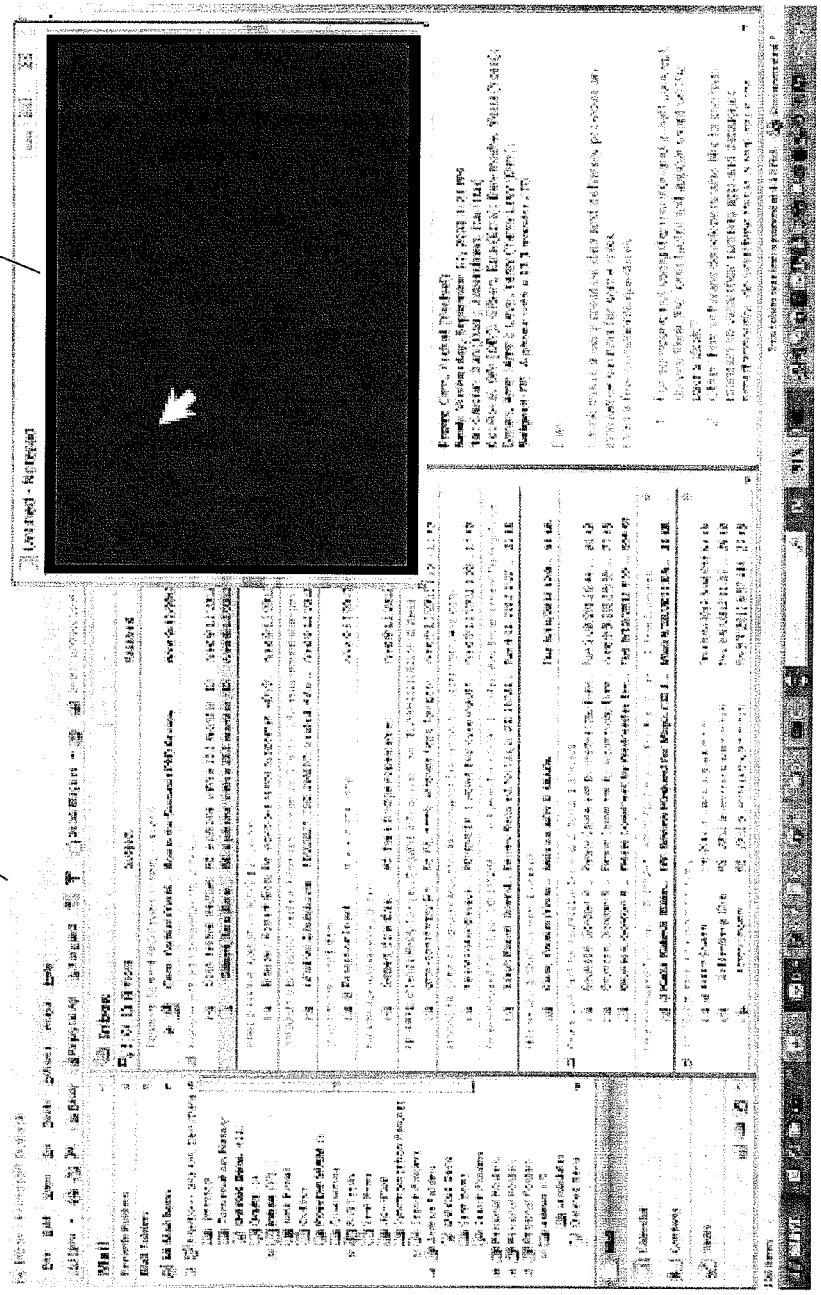
FIG. 3 shows blank window opened by the control application before phone overlay and a mouse pointer covering part of the chroma key.

FIG. 2 is a diagram of a video overlay on a PC monitor. A PC monitor 200 is used to provide display of a video window 220 on the display area 210 of the monitor. The video conference phone is enabled to overlay the video call window 220 on top of the user's PC desktop 210. For example, a typical 24 inch PC display has enough display area real estate to host a meaningful size video and a PC application. FIG. 3 is a diagram of a chroma-key overlay on a PC monitor. A control application will render a blank window (see FIG. 3) and render the video on top of it. This allows for a very lightweight, in size, resource requirements and complexity, control application. The video phone system will update the PC that a new video call has started and what its native resolution is. The control application will create a blank window and update the video phone system about its size and position. This update may be continuous or periodic. The video phone system will render the video on that exact position. When the user moves, or resizes the window 220, the video phone system will update the video overlay size and position. This allows the user to move and resize the video window 220 to a preferred size and position allowing use of the rest of the desktop. Those skilled in the art will understand rendering video windows in embodiments of the invention. A PC application will verify that it renders the empty video window on the monitor that is connected to the video phone system. Further, in an embodiment of the invention the control application may notify the video phone that the user wishes to open a window for use in a video call. In such an embodiment, the control application may have a tray icon on the desktop (in windows for example) that allows the user to launch the application. It is understood that the tray icon may be otherwise enabled to allow for a user selection. Upon selection of the icon, the control application will open a window on the desktop and communicate with the video phone regarding the opened window and provide the same information regarding the window as if the video phone had requested that it me opened. In such an embodiment, the user is enabled to control when the video phone will utilize the desktop to provide video content to a call.

FIG. 3 shows a blank window opened by the control application before phone overlay and a mouse pointer covering part of the chroma key. A PC will fill the blank window 320 with a pre-defined color and send the color code to the video phone system—along with the window size and location in the monitor desktop 310. The video phone system will treat the received color as transparent and will render the video only in pixels where the PC color equals the color-key. When the PC mouse pointer is over the video window, it covers the special color used. It thereby prevents the video phone system from rendering video on top of the mouse pointer.

The image/video rendered by the video phone on top of the blank-window created by the control application may, in addition to or instead of the video also user interface controls such as change layout, mute, participate, etc. As mentioned earlier, if the user clicks inside the window, the control application will send the click event position to the video phone. An event may be created within a window by using the mouse to click an icon, or other content, within the window or any other generally accepted manipulation of window data and content with a mouse as is understood by those skilled in the art. This allows the video phone to detect which of its user interface controls was selected by the user and react accordingly. Hence, on the same monitors there can be user interface elements rendered by the PC and user interface rendered by the video phones which are controlled in the same manner. Following the same rationale, when the control application blank window is 'in focus' it sends to the video phone all keyboard click events. This will allow the control application to send mouse click positions inside the video window to the video phone system. The video phone system is able to detect when a user presses one of the controls.

Another important configuration for this invention is when the video phone is also a Virtual Desktop Infrastructure Client. In this mode, the PC display arrives to the video phone compressed though the data network and not though a raw-video physical interface (like HDMI/DVI/DP/VGA). In this case the control application is running on the remote VDI servers which run the virtual PC for the user. In a way, this is more interesting than the regular configuration because, in many cases, VDI can't support real-time requirements of video and audio calls.

Throughout this description, a method and system for combining video phone system generated content, which may include video, graphics and user-interface elements, on top of a PC desktop in a way that allows users to manipulate and interact with the video phone system generated content in a manner akin to how the user interacts with other PC applications is presented. It is understood that the method and system is applicable with a computing device such as the PC (Personal computer), discussed throughout this description as an example, as well as a virtual PC running on VDI. FIG. 1 shows an embodiment of the invention utilizing operable connections to a computing device/PC 140 to enable the sending of video to the video phone 110. While the PC and the video phone system are herein used as appropriate examples, it is understood by those skilled in the art that any type of computing device, whether a PC or virtual PC or other device capable of generating graphic and video content on a monitor, are perfectly suited to the methods and systems of the invention. Equally, the video phone system is used as an example for a use of the method and system of the invention but those skilled in the art will understand that any intermediate appliance or system capable of receiving or generating content to overlay on a window generated from the PC, or otherwise, device. While a VDI environment is not specifically shown in FIG. 1, it is understood by those skilled in the art how to utilize embodiments shown and discussed to provide video content to the video phone 110 through operable links to either a physical computing device or a desktop rendered by a VDI client. In accordance with embodiments of the invention which may include and utilize a VDI environment, a virtual PC will run on VDI with the video-phone system acting as a VDI client.

Further, a control application is referenced throughout this description as providing functionality to the video phone system in relation to the computing device and the overlay of content on a window. The control application may reside on the video phone system or on the PC and function as herein described. Embodiments of the invention include the control application, as well as the other functionalities and hardware generally associated with a video phone as is understood by those skilled in the art, regardless of where that control application resides. Those skilled in the art will understand usages of a control application in any manner of settings.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for providing content from an intermediate system to one of one or more monitors associated with a computing device, wherein the computing device is operably linked to the intermediate system and the intermediate system is operably linked to a one monitor of the one or more monitors, the method comprising:
- by a control application, opening a window of a specific size on a desktop of the computing device, wherein the opened window is filled with a defined color and wherein the desktop is rendered and output by the computing device for display on the one monitor;
- by the control application, sending size, location on the desktop and chroma-key information of the opened window to the intermediate system;
- by the intermediate system, receiving the desktop from the computing device and overlaying content on top of the location on the desktop sent by the control application before the desktop is displayed on the one monitor; and
- by the control application, sending updated size and location information of the opened window to the intermediate system.

2. The method of claim 1, wherein the computing device comprises at least one user interface mechanism, the method further comprising:
- by the intermediate system, rendering at least one user interface element in the opened window; and
- by the control application, sending interface element events with event position data to the intermediate system resulting from an event created by the at least one user interface mechanism.

3. The method of claim 1, the method further comprising sending a chroma-key value from the control application to the intermediate system, the chroma-key value being associated with the defined color.

4. The method of claim 3, the method further comprising:
- by the intermediate application, checking the content of pixels inside the specified area of the opened window in a plurality of locations to detect a numerical value of a chroma-key value; and
- by the intermediate system, compensating for chromatic alterations when detecting pixels filled by the control application with the chroma-key.

5. The method of claim 1, wherein the intermediate system is a video phone system and the content is video content.

6. The method of claim 1, wherein the control application resides on said computing device.

7. The method of claim 1, wherein the method further comprises, by the intermediate system, sending a message to the control application to open a window of a specific size on the desktop of the computing device.

8. The method of claim 1, wherein the method further comprises, by the control application, notifying the intermediate application that a window is opened on the computing device.

9. A system for rendering a video, the system comprising:
- a computing device associated with one or more monitors; and
- an intermediate system, operably linked to a one monitor of the one or more monitors, comprising a control application;
- wherein:
  - the intermediate system is enabled to communicate with the control application regarding opening a window of a specific size on a desktop of the computing device, receive the desktop from the computing device, wherein the desktop is rendered and output by the computing device for display on the one monitor, and overlay content on top of the location of the desktop sent by the control application before the desktop is displayed on the one monitor; and
  - the control application is enabled to open a window of a specific size on the desktop of the computing device, the opened window being filled with a defined color, send size, location of the desktop and chroma-key information of the opened window to the intermediate system and send updated size and location information of the opened window to the intermediate system.

10. The system of claim 9, wherein the computing device comprises at least one user interface mechanism, wherein the intermediate system is further enabled to render user interface elements in the opened window and to send interface element events with event position data to the intermediate system resulting from an event created by the at least one user interface.

11. The system of claim 9, wherein the control application is further enabled to check the content of pixels inside the specified area as the opened window in a plurality of locations to detect a numerical value of a chroma-key value, the chroma-key value being associated with the defined color, and wherein the intermediate system is further enabled to compensate for chromatic alterations.

12. The system of claim 9, wherein the intermediate system is a video phone system.

13. The system of claim 12, wherein the content is video content.

14. A method for displaying content from an intermediate system to a monitor, wherein the intermediate system is a video phone embedded with a virtual desktop infrastructure client and has at least a one monitor, the method comprising:
- sending a communication between the intermediate system and a control application regarding opening a window of a specific size on a desktop running in a virtual desktop environment on a virtual desktop infrastructure server;
- by the control application, opening a window on the desktop, wherein the opened window is filled with a defined color and wherein the desktop is rendered and output by the computing device for display on the one monitor;
- by the control application, sending size, location and chroma-key information of the opened window to the intermediate system via the network connection;
- by the intermediate system, receiving the desktop from the computing device and overlaying content on top of the location on the desktop sent by the control application before the desktop is displayed on the one monitor; and
- by the control application, sending updated size and location information of the opened window to the intermediate system via the network connection.

15. The method of claim 14, wherein at least one user interface mechanism is enabled to interface with the desktop, the method further comprising:
- by the intermediate system, rendering at least one user interface element in the opened window; and
- by the control application, sending interface element events with event position data to the intermediate system resulting from an event created by the at least one user interface mechanism.

16. The method of claim 14, the method further comprising sending a chroma-key value from the control application to the intermediate system.

17. The method of claim 16, the method further comprising:
- by the intermediate application, checking the content of multiple pixels inside the specified area of the opened window to detect a numerical value of a chroma-key value, the chroma-key value being associated with the defined color; and
- by the intermediate system, compensating for chromatic alterations when detecting pixels filled by the control application with the chroma-key.

18. The method of claim 14, wherein the intermediate system is a video phone system and the content is video content.

19. The method of claim 18, wherein the process of sending a communication between the intermediate system and the control application comprises, by the intermediate device, sending a message to a control application to open a window of a specific size on a desktop of a computing device.

20. The method of claim 18, wherein the process of sending a communication between the intermediate system and the control application comprises, by a control application, notifying the intermediate application that a window is opened on the computing device.

* * * * *